S. G. NOTTAGE.
BALANCING MEANS FOR PHASE CONVERTING SYSTEMS.
APPLICATION FILED DEC. 9, 1916.

1,248,531.

Patented Dec. 4, 1917.

WITNESSES:

INVENTOR
Stanley G. Nottage.
BY
ATTORNEY

UNITED STATES PATENT OFFICE.

STANLEY G. NOTTAGE, OF WILKINSBURG, PENNSYLVANIA, ASSIGNOR TO WESTINGHOUSE ELECTRIC & MANUFACTURING COMPANY, A CORPORATION OF PENNSYLVANIA.

BALANCING MEANS FOR PHASE-CONVERTING SYSTEMS.

1,248,531.  Specification of Letters Patent.  Patented Dec. 4, 1917.

Application filed December 9, 1916. Serial No. 136,016.

*To all whom it may concern:*

Be it known that I, STANLEY G. NOTTAGE, a subject of the King of Great Britain, and a resident of Wilkinsburg, in the county of Allegheny and State of Pennsylvania, have invented a new and useful Improvement in Balancing Means for Phase - Converting Systems, of which the following is a specification.

My invention relates to means for adjusting and maintaining voltage balance between the phases of a polyphase system of distribution supplied through a phase converter of the rotary type, and it has for its object to provide a system of the character designated that shall be simple and inexpensive in construction and effective in operation.

Figure 1:
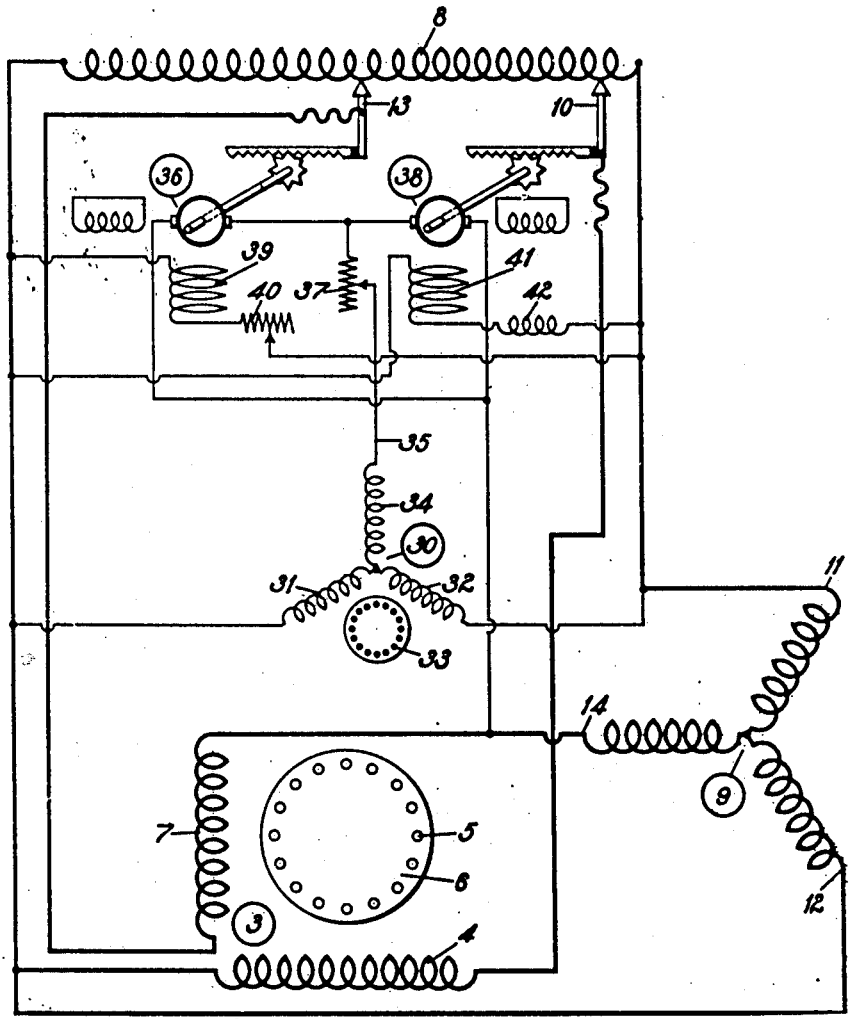
Figure 2:
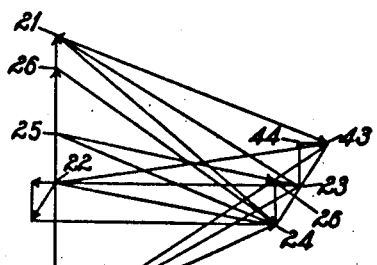

In the accompanying drawing, Figure 1 is a diagrammatic view of a phase converter of the rotary type, together with supply and load circuits and additional auxiliary apparatus constructed and arranged in accordance with a preferred form of my invention, and Fig. 2 is a vector diagram illustrating the operation of the system of Fig. 1.

Systems of distribution are well known wherein energy is transmitted in the form of single-phase alternating current and is then transformed into polyphase current for application to various translating devices, said transformation being effected by a phase-converter of the rotary type.

It is further well known that the effect of the ohmic and reactive drops in a phase-converter of the character designated is to distort or unbalance the polyphase load circuit, resulting in inefficient operation of the translating devices.

In a copending application of R. E. Hellmund, Serial No. 114,167, filed Aug. 10, 1916, and assigned to the Westinghouse Electric & Manufacturing Company, is disclosed and claimed a system wherein the above described unbalance is automatically corrected by the operation of relay devices which adjust suitable taps on the supply transformers, whereby voltage balance is maintained in the polyphase load circuit, although at the expense of a slight reduction in voltage, with an increase of load.

The present invention is, in many respects, similar to that disclosed in the Hellmund application but differs therefrom in its method of deriving actuating energy for the relay devices. Briefly speaking, I provide an auxiliary phase-converter in addition to the main phase-converter system and I operate said auxiliary phase-converter, at all times, on substantially zero load so that a substantially balanced polyphase output is maintained thereby. I then connect the corrective relay devices between points in the main converter system and corresponding points in the auxiliary converter system. Under these conditions, with a balanced condition in each load circuit, there is no difference of potential across the terminals of the relay devices and, consequently, the entire system remains in a state of equilibrium. When, however, there is a change in the load on the main converting system, resulting in a change in the relative voltage of the different parts thereof, there is developed a difference of potential between the terminals of the relay operating devices, resulting in a readjustment of the main converting system so that balance is restored therein.

Referring to the drawing for a more detailed understanding of my invention, I show a phase-converter at 3 in Fig. 1, said phase-converter embodying a primary winding 4, a secondary winding 5, taking, for example, the form of a squirrel-cage winding mounted upon a rotor member 6, and a tertiary or inducing winding 7. Energy for the operation of the phase-converter 3 is derived from any suitable source, such, for example, as a single-phase transformer secondary winding 8 and polyphase energy produced by the joint action of the winding 8 and of the phase-converter 3 is supplied to any suitable polyphase load indicated at 9.

The primary or exciting winding of the phase-converter 3 is connected between the left-hand terminal of the supply winding 8 and an adjustable tap member 10 adjacent to the right-hand end of said supply winding. Thus, the electromotive force impressed upon the primary winding 4 is substantially that of the supply winding 8. Two terminals 11 and 12 of the polyphase load 9 are connected, respectively, to the terminals of the supply winding 8 so that the voltage impressed thereupon is substantially that impressed upon the primary winding 4. The tertiary or inducing winding 7 of the phase-converter is connected between a tap member 13, adjacent to the mid point of the supply winding 8 and the third terminal 14 of the polyphase load.

A quadrature relation is provided between the primary winding 4 and the tertiary winding 7, and said tertiary winding preferably embodies a smaller number of turns than the primary winding 4 so that, by means of the well known Scott or T-connection, a substantially balanced three-phase electromotive force is supplied to the load 9.

The conditions above set forth are shown in Fig. 2, wherein the vector 20—21 represents the electromotive force supplied by the winding 8 to the terminals 11 and 12 and wherein the vector 22—23 represents the electromotive force produced in the winding 7, the triangle 20—21—23 being substantially equilateral at no load.

An auxiliary phase-converter 30 is provided and comprises primary windings 31 and 32, connected in series relation between the terminals of the supply winding 8, a secondary winding 33 mounted on a rotor member and a tertiary winding 34 disposed in quadrature relation to the winding equivalent to the windings 31 and 32. The phase converter 30 is made large, in comparison with the load it is called upon to carry, in order to insure such small internal drops that, at all times, an approximately exact three-phase relation is maintained by the voltage between its terminals.

A relay device of any desired form, such, for example, as an alternating-current commutator motor 36, is provided for the adjustment of the transformer tap 13 through a suitable mechanical connection and has its armature winding connected between the points 35 and 14 through an adjustable resistor 37. In like manner, an operating motor 38 is provided for the adjustment of the transformer tap 10 and also has its armature winding connected between the points 35 and 14. The exciting field winding 39 of the motor 36 is connected between the terminals of the supply winding 8 through an adjustable resistor 40, and the exciting field winding 41 of the motor 38 is connected between the terminals of said supply winding through a reactor 42. Thus, the phase of the electromotive force applied to the exciting field winding 39 is substantially indicated by the vector 20—21 in Fig. 2, whereas the phase of the electromotive force applied to the exciting field winding 41 is indicated by the vector 23—23 in Fig. 2.

Having thus described the arrangement of a system embodying my invention, the operation is as follows: Assuming that both the main and auxiliary phase-converting systems are in balance, the electromotive forces applied to the primary windings thereof may both be indicated by the vector 20—21 in Fig. 2 and the electromotive forces generated in the tertiary windings thereof may both be represented by the vector 22—23 in Fig. 2. Thus, the potentials of the points 35 and 14 are the same and no electromotive force is impressed upon the armature windings of the two operating devices 36 and 38. If a load be imposed upon the main converter 3, the joint effect of the ohmic and reactive drops therein is to cause the effective tertiary voltage to assume the position and magnitude indicated by the vector 22—24, and the resultant electromotive forces impressed upon the polyphase system are unbalanced, being represented by the triangle 20—21—24. The increase of the load upon the main converter produces no effect whatsoever upon the auxiliary phase converter 30, however, and the potential of the point 35, therefore, remains as indicated at 23 in Fig. 2. An electromotive force represented, in direction and in magnitude, by the vector 23—24, is thus imposed across both of the armature windings of the machines 36 and 28. The component of the electromotive force 23—24 which is in phase with the vector 20—21 produces operating torque within the motor device 36 and adjusts the transformer tap 13 to shift the point of attachment of the tertiary winding 7 from the point indicated at 22 in Fig. 2 to some such point as 25, causing the vector 22—24 to assume the position 25—26. Simultaneously, the component of the vector 23—24 in phase with the vector 22—23 produces operating torque within the relay device 38 serving to adjust the transformer tap 10, increasing the voltage applied to the primary winding 4 so as to increase the tertiary voltage 25—26 to a value 25—23. Thus, the electromotive forces impressed upon the polyphase load are again restored to balance. With a decrease in the load on the main phase-converter, the converse action takes place.

Thus, not only is a condition of balance maintained on the polyphase system, but the voltages thereof are maintained substantially constant in value over wide load changes.

In a similar manner, during regeneration, the electromotive force of the point 14 increases and alters in phase, being indicated by some such point as 43 in Fig. 2. An electromotive force 23—43 is, therefore, imposed upon the armature winding of the two motors in the opposite direction from that obtaining in the motoring condition and, as the field connections are unchanged, said motors operate in the opposite direction to restore the balance.

With both types of operation, if the load lessens, the main phase-converter tends to restore the balance of its own output without external aid but the adjustment of the windings thereof, which has previously been effected by the motors 36 and 38, causes it to overshoot the mark, lessening load during motoring causing the point 23 to travel toward 43 and lessening load during regeneration causing the point 23 to travel toward 24. Thus, in each case, an electromotive force is produced across the armatures of the two adjusting motors tending to restore the balance of the system.

My system is susceptible of various additional changes and modifications without departing from the spirit thereof. For example, the electromotive force applied to the field winding 41 may be derived from the winding 7 without the intervention of the phase-adjusting reactor 42, or may be derived from any other suitable source. If greater sensitiveness of operation is desired, relay devices of any well-known character may be inserted between the phase converter 30 and the motors 36 and 38.

In view of the manifold modifications that are possible, I desire that only such limitations shall be placed upon my invention as are imposed by the prior art or are specifically set forth in the appended claims.

I claim as my invention:

1. The combination with a single-phase, alternating-current supply system, of a variable polyphase load, a main phase-converter aggregate operating to derive single-phase energy from said source and to supply polyphase energy to said load, said polyphase energy tending to unbalance in varying degree with changes in said load, an auxiliary phase-converter aggregate operating to provide a balanced polyphase electromotive force similar to that provided by said main phase-converter aggregate, and means operative in accordance with the difference in potential between predetermined points in said main phase-converter aggregate, during unbalance, and corresponding points in said auxiliary phase-converter aggregate to restore the balance of the load of said main phase-converter aggregate.

2. The combination with a single-phase, alternating-current supply system, of a variable polyphase load, a main phase-converter aggregate operating to derive single-phase energy from said source and to supply polyphase energy to said load, said polyphase energy tending to unbalance in varying degree with changes in said load, an auxiliary phase-converter aggregate operating to provide a balanced polyphase electromotive force similar to that provided by said main phase-converter aggregate, and motor means operative in accordance with the difference in potential between predetermined points in said main converter aggregate and corresponding points in said auxiliary phase-converter aggregate to adjust the electromotive forces supplied to said main phase-converter aggregate and to restore the balance of the electromotive forces supplied to said polyphase load.

3. The combination with a source of single-phase, alternating current, of a transformer having its primary winding connected thereto, a main phase-converter aggregate operating in conjunction with the secondary winding of said transformer to supply polyphase electromotive forces to a varying polyphase load, an auxiliary phase-converter aggregate also operating to produce polyphase electromotive forces from said secondary winding, and electromotor means connected between predetermined points in said main phase-converter aggregate and corresponding points in said auxiliary phase-converter aggregate and operative to adjust the points of connection of said main phase-converter aggregate to the secondary winding of said transformer when a difference of potential is produced between the points of connection of said motor means by reason of unbalance in said main phase-converter aggregate.

4. The method of producing a corrective electromotive force for causing the balancing of the phases of a polyphase consumption circuit operating from a single-phase supply through a main phase-converter aggregate which comprises maintaining, at all times, auxiliary balanced polyphase electromotive forces having values which normally coincide with points in the main phase-converter aggregate in phase and in voltage and causing adjustment of said main phase-converter aggregate in accordance with the electromotive forces developed between said normally coinciding points during times of load change in said main phase-converter aggregate.

In testimony whereof, I have hereunto subscribed my name this 23rd day of November, 1916.

STANLEY G. NOTTAGE.